US011704579B2

(12) United States Patent
Zhang et al.

(10) Patent No.: US 11,704,579 B2
(45) Date of Patent: Jul. 18, 2023

(54) EARTH MODELING METHODS USING MACHINE LEARNING

(71) Applicant: QUANTICO ENERGY SOLUTIONS LLC, Houston, TX (US)

(72) Inventors: Barry F. Zhang, Houston, TX (US); Orlando De Jesus, Frisco, TX (US); Tuna Altay Sansal, Pearland, TX (US); Dingding Chen, Tomball, TX (US); Edward Tian, Houston, TX (US); Muhlis Unaldi, Houston, TX (US)

(73) Assignee: QUANTIC ENERGY SOLUTIONS LLO, Houston, TX (US)

( * ) Notice: Subject to any disclaimer, the term of this patent is extended or adjusted under 35 U.S.C. 154(b) by 559 days.

(21) Appl. No.: 16/852,084

(22) Filed: Apr. 17, 2020

(65) Prior Publication Data

US 2021/0326721 A1    Oct. 21, 2021

(51) Int. Cl.
*G06N 5/04* (2023.01)
*G06N 20/20* (2019.01)
(Continued)

(52) U.S. Cl.
CPC .............. *G06N 5/04* (2013.01); *E21B 49/00* (2013.01); *G01V 1/282* (2013.01); *G01V 99/005* (2013.01); *G06N 20/20* (2019.01); *E21B 2200/20* (2020.05)

(58) Field of Classification Search
CPC .......... G06N 5/04; G06N 20/20; E21B 49/00; G01V 1/282; G01V 99/005
(Continued)

(56) References Cited

U.S. PATENT DOCUMENTS 10,242,312 B2 *    3/2019    Storm, Jr. ................ G06N 3/08
10,677,052 B2 *    6/2020    Storm, Jr. ................ E21B 49/00
(Continued)

FOREIGN PATENT DOCUMENTS

WO    2020010297 A1    1/2020

OTHER PUBLICATIONS

Jain et al. (Class-Based Machine Learning for Next-Generation Wellbore Data Processing and Interpretation, SPWLA 60th Annual Logging Symposium, Jun. 15-19, 2019, pp. 1-17) (Year: 2019).*
(Continued)

*Primary Examiner* — Iftekhar A Khan
(74) *Attorney, Agent, or Firm* — Patterson + Sheridan, LLP

(57) ABSTRACT

Aspects of the present disclosure relate to earth modeling using machine learning. A method includes receiving detected data at a first depth point along a wellbore, providing at least a first subset of the detected data as first input values to a machine learning model, and receiving first output values from the machine learning model based on the first input values. The method includes receiving additional detected data at a second depth point along the wellbore, providing at least a second subset of the additional detected data as second input values to the machine learning model, and receiving second output values from the machine learning model based on the second input values. The method includes combining the first output values at the first depth point and the second output values at the second depth point to generate an updated model of the wellbore, the updated model comprising an earth model.

17 Claims, 7 Drawing Sheets

(51) Int. Cl.
   *E21B 49/00* (2006.01)
   *G01V 1/28* (2006.01)
   *G01V 99/00* (2009.01)

(58) Field of Classification Search
   USPC .......................................................... 175/50
   See application file for complete search history.

(56) References Cited

U.S. PATENT DOCUMENTS

| | | | | |
|---|---|---|---|---|
| 10,788,602 | B2* | 9/2020 | Song | G01V 3/38 |
| 11,194,072 | B2* | 12/2021 | Wilson | G01V 3/38 |
| 11,333,792 | B1* | 5/2022 | Lemons | G01V 99/005 |
| 11,428,077 | B2* | 8/2022 | Xu | E21B 49/00 |
| 2004/0257240 | A1* | 12/2004 | Chen | G01V 3/38 340/853.1 |
| 2013/0124166 | A1* | 5/2013 | Clemens | G06F 17/10 703/2 |
| 2013/0289962 | A1* | 10/2013 | Wendt | G01V 1/28 703/10 |
| 2014/0067353 | A1* | 3/2014 | Shelley | G06N 3/042 703/10 |
| 2014/0351183 | A1* | 11/2014 | Germain | E21B 44/00 706/12 |
| 2014/0365409 | A1* | 12/2014 | Burch | G06N 20/00 706/12 |
| 2015/0218914 | A1* | 8/2015 | Marx | G06N 5/02 175/24 |
| 2016/0222766 | A1* | 8/2016 | Rowan | E21B 41/00 |
| 2017/0364795 | A1* | 12/2017 | Anderson | G06N 20/10 |
| 2018/0025269 | A1* | 1/2018 | Dursun | E21B 41/00 175/24 |
| 2019/0169986 | A1* | 6/2019 | Storm, Jr. | G01V 11/00 |
| 2019/0292898 | A1* | 9/2019 | Quattrone | E21B 44/04 |
| 2019/0361146 | A1* | 11/2019 | Roth | G01V 1/50 |
| 2020/0011158 | A1* | 1/2020 | Xu | E21B 44/00 |
| 2020/0160173 | A1* | 5/2020 | Pandey | G06N 3/045 |
| 2020/0160559 | A1* | 5/2020 | Urtasun | G06T 7/75 |
| 2020/0225177 | A1* | 7/2020 | Sungkorn | G01V 3/18 |
| 2020/0278465 | A1* | 9/2020 | Salman | G01V 1/301 |
| 2020/0301036 | A1* | 9/2020 | Ramfjord | G01V 1/50 |
| 2020/0378236 | A1* | 12/2020 | Brumbaugh | E21B 44/02 |
| 2021/0049485 | A1* | 2/2021 | Bosch Blumenfeld | G06N 3/08 |
| 2021/0089897 | A1* | 3/2021 | Zhang | G01V 1/306 |
| 2021/0181366 | A1* | 6/2021 | Fan | G06N 3/045 |
| 2021/0222552 | A1* | 7/2021 | Gao | G06N 20/00 |
| 2021/0247534 | A1* | 8/2021 | Bø | G06N 3/08 |
| 2021/0318464 | A1* | 10/2021 | Tawil | E21B 47/022 |
| 2021/0319304 | A1* | 10/2021 | Tawil | G06F 30/27 |
| 2021/0326721 | A1* | 10/2021 | Zhang | E21B 49/00 |
| 2022/0099855 | A1* | 3/2022 | Li | G01V 1/345 |
| 2022/0121987 | A1* | 4/2022 | Grady | G06N 20/00 |
| 2022/0129788 | A1* | 4/2022 | Zhang | G06N 20/00 |

OTHER PUBLICATIONS

Thomas Dietterich (Ensemble Learning, Oregon State University, ,2002, pp. 1-9) (Year: 2002).*
International Search Report / Written Opinion issued to PCT/US2020/038607.

* cited by examiner

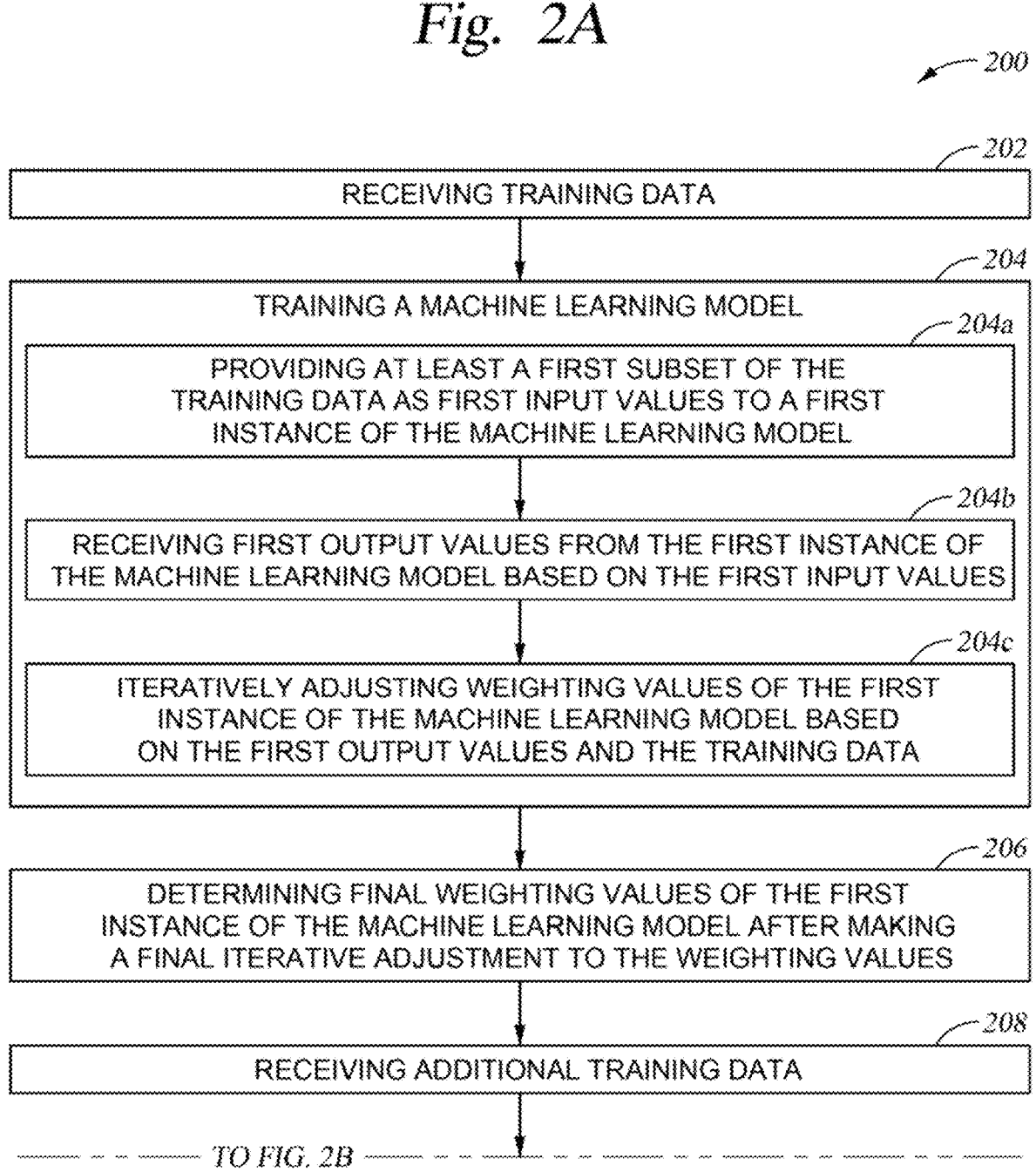

EARTH MODELING METHODS USING MACHINE LEARNING

BACKGROUND OF THE DISCLOSURE

Field of the Disclosure

The present disclosure generally relates to earth modeling methods using machine learning.

Description of the Related Art

Earth models are well recognized as a preferred means of creating and optimizing well paths, as they allow a user to visualize the geology at an intended wellbore landing zone, as well as zones above and below that may present hazards or other drilling opportunities. However, earth models are often cumbersome to deal with and require complex proprietary software and specialized expertise to manipulate.

Traditional earth models are typically created through a seismic inversion process that can be difficult and time consuming. Seismic inversion generally requires a high level of expertise and conditioned seismic data with proper offset well logs as inputs, which are often limited in supply. In addition, the entire process of generating a seismic inversion is generally very expensive, and suffers from accuracy issues depending on the vintage of the survey and design parameters. Furthermore, manually harmonizing structural interpretations between earth models and seismic volumes is a difficult process. For at least the foregoing reasons, earth models are not often updated and/or are updated at a frequency that is less than optimal. Even if earth models could be updated more frequently, manual users would have difficulty in reliably evaluating output data streams with enough time to adapt to updated formation features that may prove hazardous to drilling.

Some techniques involve the use of machine learning models as a complement to inversion earth models. However, both manual methods and conventional techniques involving machine learning models have limitations, such as limited sampling and, most importantly, lack of training data.

Conventional techniques involving machine learning models share the following shortcomings:

Conventional techniques perform model initialization using random weighting values. In dynamic updates of the Earth model, randomly weighted values generally cause instability in previously determined properties and/or unnecessary changes to modeled data behind the bit (i.e., sections already drilled through).

Conventional techniques receive log data in a depth domain and seismic data in a time domain. A process of tying is used to accurately relate the seismic data to the log data, usually by converting the seismic data to the depth domain. However, converting seismic data to the depth domain is a slow process.

Conventional techniques employ models having manually selected and fixed input variables, which are prone to depend too heavily on redundant variables while overpowering less redundant variables. The overall effect produces a biased model.

Conventional techniques are limited to application of a single machine learning model. Since the selected machine learning model evaluates only a single corresponding learning algorithm, it is rendered statistically inferior as a result of local optima of the training, lack of the generalization and other uncertainty associated with input selection, model complexity determination, learning termination criteria and data partitioning for the training, validation and testing.

Conventional physics-based modeling techniques fail to update inversions programmatically because substantial human interpretation is needed to update models according to conventional practice.

SUMMARY OF THE DISCLOSURE

Aspects of the present disclosure relate to programmatically running a machine learning model with new data to generate a real-time earth model. Certain embodiments include receiving detected data at a first depth point along a wellbore, providing at least a first subset of the detected data as first input values to a machine learning model, and receiving first output values from the machine learning model based on the first input values. Certain embodiments include receiving additional detected data at a second depth point along the wellbore, providing at least a second subset of the additional detected data as second input values to the machine learning model, and receiving second output values from the machine learning model based on the second input values. Certain embodiments include combining the first output values at the first depth point and the second output values at the second depth point to generate an updated model of the wellbore, wherein the updated model of the wellbore comprises an earth model.

Aspects of the present disclosure relate to carrying over weighting values between instances of a machine learning model. Certain embodiments include receiving training data, training a machine learning model, and determining final weighting values of a first instance of the machine learning model after making a final iterative adjustment to weighting values of the first instance of the machine learning model. Certain embodiments include receiving additional training data and re-training the machine learning model by initializing weighting values of a second instance of the machine learning model using the final weighting values from the first instance of the machine learning model. Certain embodiments include generating an earth model based on output values from at least one of: the first instance of the machine learning model, the second instance of the machine learning model, or a combination thereof, and adjusting a drilling operation according to the earth model.

Aspects of the present disclosure relate to automatically selecting machine learning model inputs. Certain embodiments include receiving a first machine learning model having N different inputs, wherein N is greater than 1 and performing, for a total of from 1 to N steps, a backward stepwise input selection to automatically generate at least one additional machine learning model of a plurality of machine learning models. Certain embodiments include selecting a candidate machine learning model of the plurality of machine learning models, generating an earth model based on output values from the candidate machine learning model, and adjusting a drilling operation according to the earth model.

Aspects of the present disclosure relate to ensemble earth modeling. Certain embodiments include constructing a plurality of candidate ensembles, wherein each candidate ensemble includes a plurality of different machine learning models, implementing an optimization algorithm to select a first ensemble of the plurality of candidate ensembles, wherein the optimization algorithm evaluates each candidate ensemble on a multi-objective function, and generating simulation outputs using the first ensemble. Certain embodiments include generating an earth model based on the simulation outputs from the first ensemble and adjusting a drilling operation according to the earth model. While conventional techniques with single model realization have inherent limitation in multivariate drilling and formation data analysis, the innovation of using an ensemble of machine learning algorithms may prove to be more robust in many applications, capable of systematically generating weighted outputs from various models with customizable objective function, providing integrated solutions to better compensate for deficiencies of the single model implementation which is often based on the arbitrary selection process.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 2A-2B illustrate example operations for carrying over weighting values between instances of a machine learning model.

DETAILED DESCRIPTION

Figure 1:
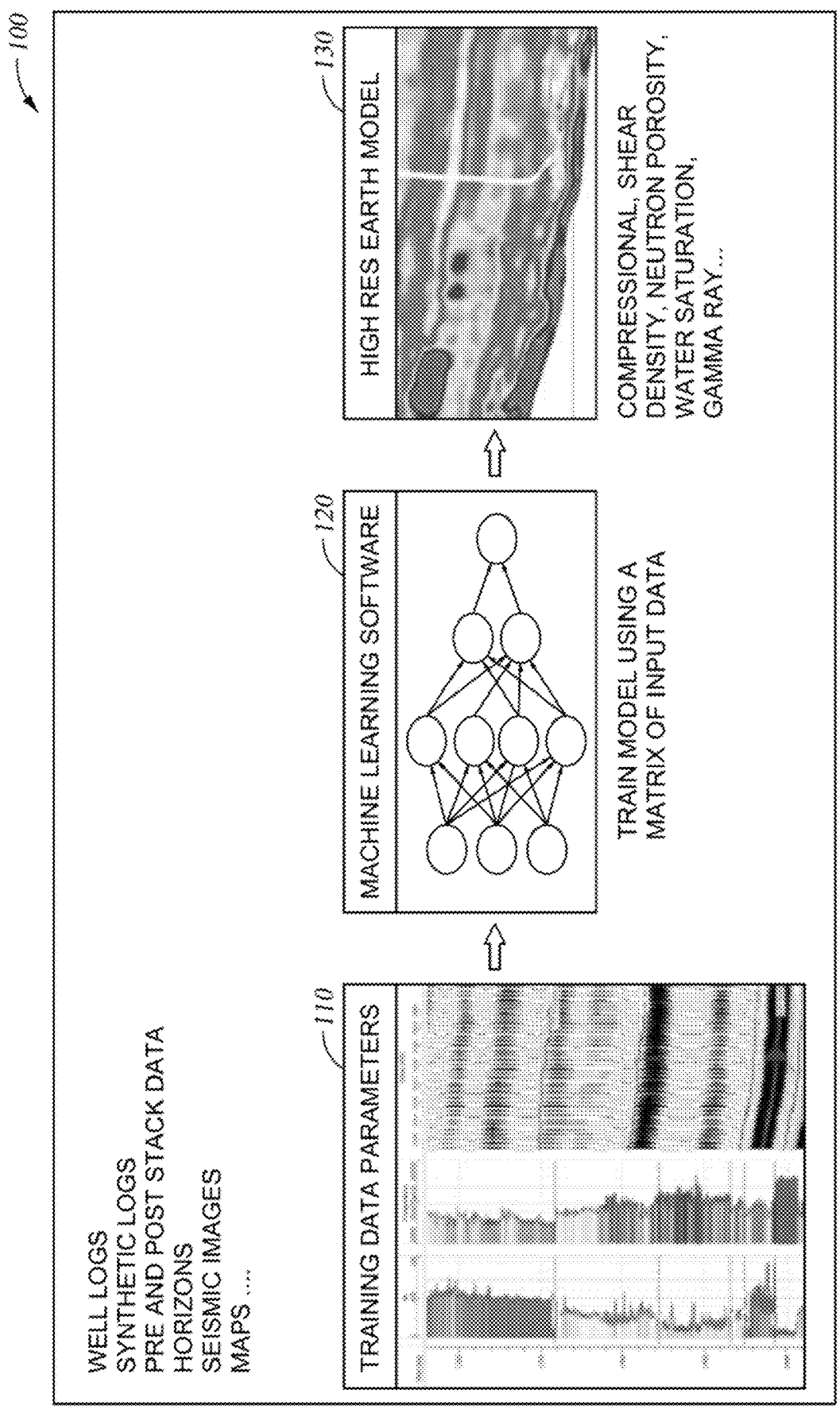
FIG. 1 illustrates an example related to earth modeling using artificial intelligence.

Embodiments of the present disclosure relate to earth modeling methods using machine learning. In some aspects, a machine learning model can be trained by carrying over weighting values between instances of the machine learning model. In some aspects, dynamic tying of time and depth can be used to avoid slow conversion rates. In some aspects, automatic selection of input variables can be used to generate candidate machine learning models. In some aspects, modeling ensembles can be automatically generated for more accurate modeling. In some aspects, computer vision can be used to automatically interpret formation features. In some aspects, the techniques described herein can be used to generate and update earth models in real-time or within a few hours of real-time based on measurements taken while drilling.

A neural network (sometimes referred to as an artificial neural network or ANN) is generally based on a biological brain, and includes a plurality of interconnected nodes or "neurons". Each node generally has one or more inputs with associated weights, a net input function, and an activation function. Nodes are generally included in a plurality of connected layers, where nodes of one layer are connected to nodes of another layer, with various parameters governing the relationships between nodes and layers and the operation of the neural network. A shallow neural network generally includes only a small number of "hidden" layers between an input layer and an output layer. By contrast, a deep learning model, such as a deep neural network, deep belief network, recurrent neural network, or convolutional neural network, generally includes a larger number of hidden layers.

In certain embodiments, the model uses multiple inputs to generate one or multiple outputs. The inputs can be taken at the same or different depths (or times) of the outputs to be produced. The individual inputs (e.g., $p_1, p_2, \ldots, p_R$) are weighted by the corresponding elements (e.g., $w_{1,1}, w_{1,2}, \ldots, w_{1,R}$) of the weight matrix W. Each neuron has a bias b, which is summed with the weighted inputs to form the net input $n=Wp+b$. The net input n is then applied to a transfer function $f$. The transfer function can be a linear or nonlinear function of n. A particular transfer function is selected based on the problem to solve. Typical transfer functions are linear, hard limit, hyperbolic Tangent Sigmoid (tansig), Log-Sigmoid (logsig) or Competitive functions. The output of a neuron a can be defined as $a=f(Wp+b)$. In certain embodiments, the transfer function can be an objective function, such as a cost function.

A single-layer network of S neurons will operate over a vector of inputs p to generate an output a, while a combination of layers will create a multilayer neural network. A layer whose output is the network output is the output layer. The other layers are called hidden layers. After the architecture is defined, the next step is training the multilayer neural network. One example training method is called backpropagation, which is a generalization of the Least Mean Square error or LMS algorithm. Backpropagation is an approximate steepest descent algorithm, in which the performance index is mean square error. The general steps are: propagate the inputs forward to the network, then calculate the sensitivities backward through the network and use the sensitivities to update the weights and biases using a steepest descent rule. The process is repeated until the objective function is minimized, a number of iterations is executed, or the error of an alternate set of data increases after a few iterations.

Neural networks are a technology well-suited to finding the non-linear correlations that exist among large data sets. Neural networks have been applied in certain contexts related to oil and gas exploration, including litho-faces analysis, detection of microseismic events, seismic inversion, and the like.

In the present solution, inputs used to train a machine learning model such as a neural network may include a wide variety of information types, including seismic volumes (both pre- and post-stack), seismic geologic maps, seismic images, electromagnetic volumes, checkshots, gravity volumes, horizons, synthetic log data, well logs, mud logs, gas logs, well deviation surveys, isopachs, vertical seismic profiles, microseismic data, drilling dynamics data, initial information from wells, core data, gamma, temperature, torque, differential pressure, standpipe pressure, mud weight, downhole accelerometer data, downhole vibration data, and combinations thereof. In certain embodiments, inputs may include gamma, resistivity, neutron, density, compressional, and/or shear logs. In certain embodiments, attributes from different depth points are used as training data along with adjacent waveforms from a plurality of directions (e.g., above, below, to the sides such as left and right, forward, and/or backward) with respect to each depth point.

In general, machine learning models, such as neural networks, use weighting values in order to adjust a relative contribution of each input variable to the overall model. Mathematically speaking, each weighting value is a coefficient in the equation being resolved (objective function). In other words, each weighting value applies a unique scaling factor to its respective input variable in the objective function.

Supervised training methods generally involve providing training inputs to a model, comparing outputs of the model to labels that have been assigned to the training inputs, and iteratively adjusting parameters of the model until the outputs match the labels. Labels correspond to parameters that are output by the model, and represent actual "known" values for these parameters for a given set of training inputs. For example, labels may be assigned to a given set of training inputs based on a correlation between the given set of training inputs and a particular value for a parameter that was measured or determined at the time the training inputs were measured or determined. Parameters output by the model may include, for example, rock properties and geomechanics, gamma, resistivity, neutron, density, acoustic impedance and velocity, stress, brittleness, Young's modulus and Poisson's ratio, mud weights, compressive strength, friction angle, pore pressure attributes, fracture gradients, wellbore stability, petro-physical properties, total organic content, water saturation, porosity, permeability, lithofacies classifications, and/or the like.

In certain embodiments, after the model has been trained, measurements collected by a well operator (e.g., gamma, resistivity, neutron, density, compressional, shear, temperature, torque, differential and standpipe pressure, mud weight, fluid pressure, checkshots and/or the like) and, in certain embodiments, parameters derived from the measurements (Young's modulus, Poisson's ratio, fracture gradient, pore pressure, and/or the like), are provided as inputs to the model, and the parameters output by the model, including parameters at various depth points and in a reference window around each depth point, such is in XY space and/or Z space, are used to generate earth models. Input parameters may be continuously measured and provided to the model to produce updated outputs so that an earth model can be updated in real-time.

Use of techniques described herein can help enhance and "operationalize" earth models for any organization. In certain reservoirs, the earth model can be used to optimize well placement, and as the well is being drilled, the earth model can be updated to ensure the well is landed in and staying in the desired zone. As the models are continuously updated, techniques described herein are dynamic and not static like traditional inversions. The models can be quickly updated when new well information becomes available without the requirement to re-run the entire process. The eventual product of techniques described herein may be a geocellular model that may be directly input into reservoir simulators.

Use of techniques described herein provides companies with the ability for improved decision making regarding whether a given area is worthy of development, deciding on a well placement and well path, adjusting drilling mud weights to avoid wellbore instability events, and optimizing well completion designs. Decisions made based on earth models generated and updated in real-time using techniques described herein can significantly improve the human and environmental safety of drilling operations as well as the initial production rates and estimated ultimate recovery for an operator's well program across a project area. These are all important decisions with potential impacts in the millions to billions of dollars.

Utilizing an accurate, geomechanical earth model ensures that these key decisions are made optimally. Embodiments of the present disclosure incorporate highly supervised machine learning models that greatly reduce risk and uncertainty critical to making strategic, tactical decisions, and calculating value of information. Additional properties of interest can be derived from databases with calibration points. Cross validation using blind well methods decreases the chances of the network being over-trained and ensures the quality of the method.

The techniques described herein are driven by data, and are not restricted by a convolutional model biased by human interference. Furthermore, embodiments of the present disclosure reduce the overall timeline and budget of an earth modeling project.

The ability to see earth properties in real-time using techniques described herein allows for adjustments in mud weight to avoid pressure kicks, which can lead to blowouts, and re-orient course to avoid pressure pockets or faults, both of which have safety and financial consequences, respectively. Furthermore, updating the earth model in real-time or near real-time according to embodiments of the present disclosure for a given radius, such as 0.5 to 1 mile, around the latest real-time log (both a measured log or a synthetically derived log) measurement depth allows the driller to see these earth properties ahead of the drill bit. This is an improvement over conventional techniques in which earth models may take weeks to months to update, and where the driller cannot see updated earth property information ahead of the bit.

In particular embodiments, an earth model is created by finding non-linear ties between well log data and a seismic image volume in a statistical fashion. The process preserves realistic output without the specification of somewhat arbitrary constraints as in done in traditional seismic inversion, as the machine learning model is able to learn the underlying physics as a part of the network training process.

Machine learning model training can be flexible in terms of the type of data that is input and output. Certain embodiments involve a workflow that is based on traces extracted along wellbores where control data (density and compressional slowness logs) have been recorded or derived synthetically. In addition to the well and seismic data, interpreted maps such as isopachs, average porosity, depth, etc. as derived from well logs can be included as constraints during the training process. This allows the inversion not only to discover the inherent physics at play but also to allow the intuitions of the interpreter to guide the output. In one example, isopach, depth, and average porosity maps interpreted from wells, wells logs with density/sonic slowness, and wells logs with density/neural network-derived synthetic sonic are used to train a machine learning model.

Another additional benefit of techniques described herein is the dramatic simplification of a standard earth modeling workflow. The operational outcome of techniques described herein includes a shorter and less labor-intensive project lifespan, with reduced need for specialized software. In short, embodiments of the present disclosure have been shown to be a potential enabler for timely earth model generation for day-to-day decision making regarding acreage acquisition, well placement, field development, and the like.

FIG. 1 illustrates an example 100 related to earth modeling using artificial intelligence.

Training data parameters 110 are based on a variety of training inputs, such as well logs, synthetic logs, pre and post stack data, horizons, seismic images, maps, and the like, and include labels indicating values for various output parameters of the model (e.g., including geomechanical, wellbore stability, pore pressure, and/or petrophysical attributes), such as compressional, shear, density, neutron, porosity, water saturation, gamma, resistivity, elastic properties such as Young's modulus and Poisson's ratio, acoustic impedance and velocity, stress, brittleness, mud weights, compressive strength, friction angle, pore pressure attributes, fracture gradients, total organic content, permeability, lithofacies classifications, and the like. In certain embodiments, the training data parameters 110 include parameters at a plurality of depth points along with adjacent waveforms for each depth point in a plurality of directions, such as within a reference window in XY and/or Z space (e.g., upward, downward, left, right, forward, and/or backward).

A machine learning model 120 is trained based on training data parameters 110, such as by using a matrix of input data. The machine learning model 120 may comprise a plurality of layers with interconnected nodes. In certain embodiments, the machine learning model 120 can be a multi-input multi-output (MIMO) model (e.g., a MIMO neural network). In certain embodiments, the MIMO model can improve lateral continuity and/or consistency of simulation data compared to a conventional multi-input single-output (MISO) model. In certain embodiments, the MIMO model involves shared network inputs and hidden-layer connecting parameters. In certain embodiments, the MIMO model can predict multiple logs using a single network model. In certain embodiments, the MIMO model can have constraints of multiple logs built-in to training outputs. In certain embodiments, the MIMO model can provide self-consistent predictions. In certain embodiments, the MIMO model can lower training cost, lower calibration cost, streamline model compute time, and/or make model management easier. In certain embodiments, the machine learning model 120 can be updated ahead of the bit to improve well placement, kick avoidance, loss avoidance, changes to mud weight, drilling efficiency, and/or locating casing points.

Once trained, the machine learning model 120 is used to produce an earth model 130, which models various parameters output by machine learning model 120, such as compressional, shear, density, neutron porosity, porosity, water saturation, gamma ray, and the like. Parameters may be output by machine learning model 120 in real-time or near real-time, and may include parameters at various depth points as well as adjacent parameters (e.g., waveforms) in a plurality of directions with respect to each depth point. As such, techniques described herein provide real-time properties both at the bit position and ahead of the bit position. Accordingly, an earth model can be determined and continuously updated, allowing improved decisions to be made in real-time with respect to a given well.

Figure 2B:
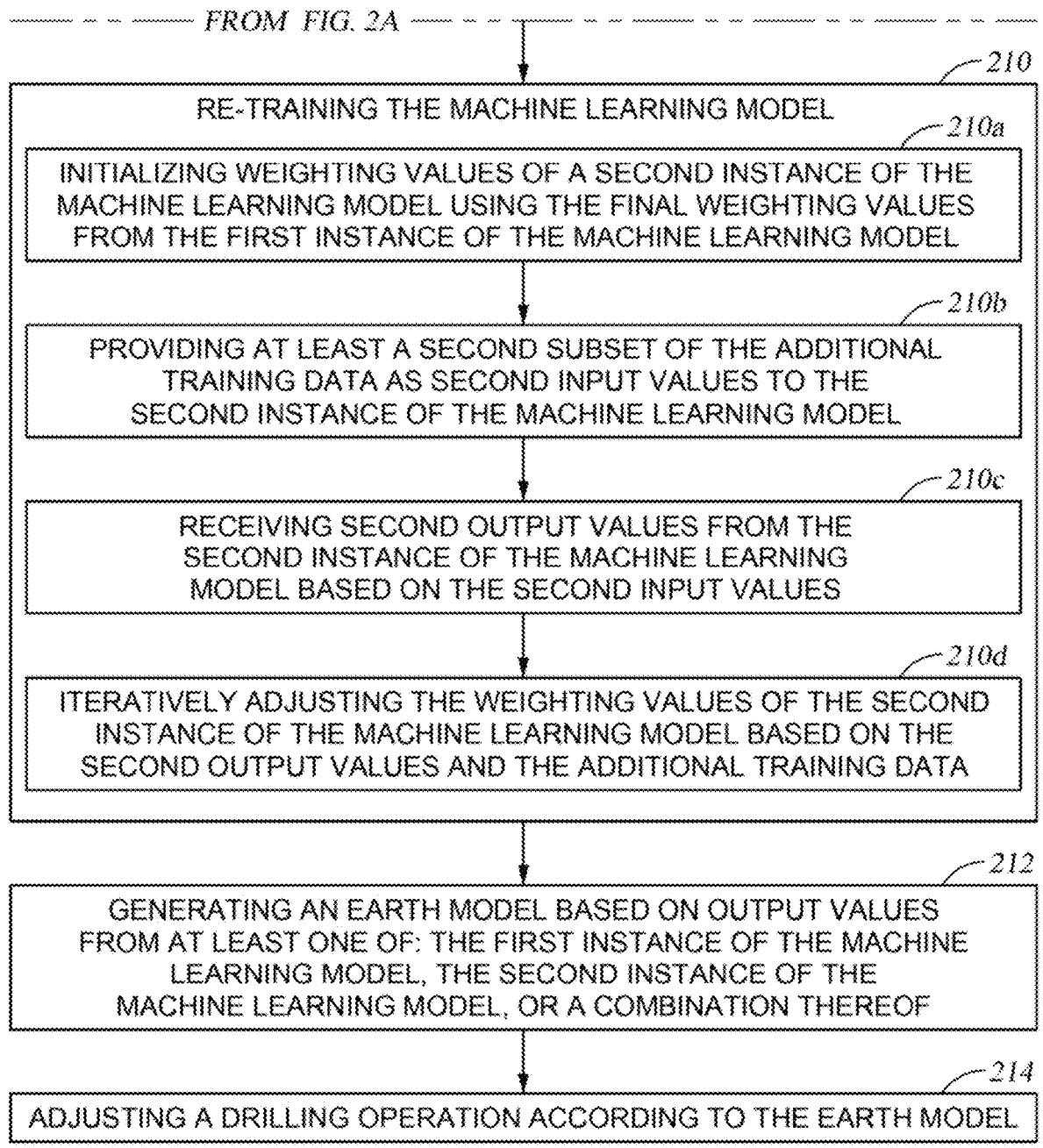

As mentioned earlier, conventional techniques perform model initialization using random weighting values across multiple iterations, potentially resulting in erroneous and/or unnecessary changes to modeled data behind the bit. Aspects of the present disclose can avoid making erroneous and/or unnecessary changes to modeled data by carrying over weighting values from one instance of a machine learning model to the next. In that regard, FIGS. 2A-2B illustrate example operations 200 for carrying over weighting values between instances of a machine learning model.

Referring to FIG. 2A, operations 200 begin at block 202, by receiving training data. For example, the training data may include formation and/or wellbore attributes relating to a plurality of depth points along a wellbore in the formation. In certain embodiments, the training data may include attributes relating to the plurality of depth points. In certain embodiments, the training data may further include waveform data in a plurality of directions with respect to each depth point of the plurality of depth points. The plurality of directions may include, for example, up and down (e.g., in Z space), and/or left, right, forward and backward (e.g., in XY space).

In certain embodiments, each training input is associated with a corresponding label. For example, the training inputs may include one or more attributes related to a wellbore that have been measured or determined based on measured data, and the labels may comprise different properties related to the wellbore that are to be output by a machine learning model. It is noted that "labels" are only included as one example for training a machine learning model, and other techniques may be used to train a machine learning model based on attributes at depth points and adjacent waveforms. In certain embodiments, the attributes are captured by various sensors during a drilling or reservoir stimulation operation. In certain embodiments, the attributes also include attributes derived from measurements, such as synthetic logs.

In certain embodiments, the training data may include a wide variety of information types, including seismic volumes (both pre- and post-stack), seismic geologic maps, seismic images, electromagnetic volumes, checkshots, gravity volumes, horizons, synthetic log data, well logs, mud logs, gas logs, well deviation surveys, isopachs, vertical seismic profiles, microseismic data, drilling dynamics data, initial information from wells, core data, gamma, temperature, torque, differential pressure, standpipe pressure, mud weight, downhole accelerometer data, downhole vibration data, gamma, resistivity, neutron, density, compressional, and/or shear logs, and combinations thereof.

Operations 200 continue at block 204, by training a machine learning model, where training the machine learning model includes one or more intermediate steps. In certain embodiments, the machine learning model may be an artificial neural network, deep neural network, deep belief network, recurrent neural network, convolutional neural network, or the like. It is noted that these are only included as examples and other types of machine learning models may be used with techniques described herein. In certain embodiments, the machine learning model may be selected from a plurality of candidate machine learning models.

Operations 200 continue at block 204a, by providing at least a first subset of the training data as first input values to a first instance of the machine learning model. In certain embodiments, the first subset may include a portion of the training data, such as a portion of information types, a portion of depths, and/or a portion of directions. In certain embodiments, the first subset may be selected randomly. In certain embodiments, the first subset may be selected automatically, such as by using an automatic input selection method described herein. In certain embodiments, the first subset may be selected based on historical data, such as historical trends and/or correlations. In certain embodiments, the first instance of the machine learning model may be initialized using random weighting values.

Operations 200 continue at block 204b, by receiving first output values from the first instance of the machine learning model based on the first input values. In certain embodiments, the first output values may be determined by computing a value of an objective function of the machine learning model based on the first input values and current weighting values.

Operations 200 continue at block 204c, by iteratively adjusting weighting values of the first instance of the machine learning model based on the first output values and the training data. For example, the first output values from the first instance of the machine learning model may be compared with their respective labels, and the weighting values may be adjusted based on the comparison. In certain embodiments, iteratively adjusting the weighting values of the first instance of the machine learning model may include adjusting the weighting values to minimize a mean square error between each output value and its respective label, where each label represents a known value for a corresponding input. In certain embodiments, optimization can involve backpropagation using CG, L-BFGS, Bayes, LM, Adadelta, Adam, Ftrl, RMSprop, ASGD, Rprop, other suitable optimization algorithms, and combinations thereof.

In certain embodiments, other parameters besides weighting values may be iteratively adjusted including, for example, hyperparameters related to numbers of iterations, numbers of hidden layers and nodes, connections between layers and nodes, and functions associated with nodes. In certain embodiments, the step of iteratively adjusting weighting values may be repeated until an objective function is minimized, a number of iterations is executed, or the error of an alternate set of data increases after a few iterations.

Operations 200 continue at block 206, by determining final weighting values of the first instance of the machine learning model after making a final iterative adjustment to the weighting values. In certain embodiments, the final weighting values may be weighting values that optimize the objective function. In certain embodiments, the objective function may be optimized by determining final weighting values that provide a minimum value for the objective function, where the minimum value is less than or about equal to each preceding value of the objective function determined during the current iterative process. In certain embodiments, the objective function may be optimized by determining final weighting values that provide a maximum value for the objective function, where the maximum value is greater than or about equal to each preceding value of the objective function determined during the current iterative process. In certain embodiments, the final weighting values may be weighting values determined along an asymptotic curve of epochs versus objective function variance.

Operations 200 continue at block 208, by receiving additional training data. In certain embodiments, the additional training data may include one or more training data information types described herein. In certain embodiments, the additional training data may include updated data from measurements recorded after providing at least the first subset of the training data as first input values to the first instance of the machine learning model. In certain embodiments, the training data may be updated each time new measurements are recorded. In certain embodiments, the training data may be updated at predetermined drilling intervals, such as intervals from about 5 ft to about 100 ft, such as intervals from about 25 ft to about 75 ft, such as intervals of about 50 ft. In certain embodiments, the training data may be updated at pre-determined time intervals, such as intervals from about 5 min to about 120 min, such as intervals from about 30 min to about 90 min, such as intervals of about 60 min.

Referring to FIG. 2B, operations 200 continue at block 210, by re-training the machine learning model, where re-training the machine learning model includes one or more intermediate steps. For instance at block 210a, operations 200 continue by initializing weighting values of a second instance of the machine learning model using the final weighting values from the first instance of the machine learning model. Carrying over the final weighting values of the first instance of the machine learning model to initialize the weighting values of the second instance of the machine learning model, as opposed to using random weighting values, can avoid erroneous and/or unnecessary changes to modeled data behind the bit. In that regard, carrying over the final weighting values from the first instance to the second instance of the machine learning model may assume that a portion of the formation represented by the additional training data has one or more properties that are more similar to a portion of the formation represented by the original training data compared to a random portion of the formation represented by random weighting values.

In certain embodiments, the final weighting values can be transferred at the ensemble-level. In certain embodiments, instead of transferring weights, data captured at the ensemble-level can be used with similar effect to the carrying over of weighting values. For instance, an ensemble may reference a previous model and/or an earlier generation of the ensemble, independently of weighting values. In other words, ensemble selection may be constrained based on previous cycles to improve modeling consistency, especially in sections already drilled through.

In certain embodiments, the first and second instances of the machine learning model may share at least one of: common learning algorithms, common architectures, common input information types, common variables, common biases, common weighting matrices, common objective functions, common hyperparameters related to numbers of iterations, common numbers of hidden layers and nodes, common connections between layers and nodes, and common functions associated with nodes. In certain embodiments, the first and second instances of the machine learning model may represent at least one of: different depth points in the formation, different positions along the wellbore, different directions, different time intervals, and different data sets. In certain embodiments, the first and second instances of the machine learning model may only differ by representing different physical positions and/or time intervals. In certain embodiments, the first and second instances of the machine learning model may only differ with regard to their respective training data sets. In certain embodiments, the second instance of the machine learning model may only differ by including updated training data. In certain embodiments, the first and second instances of the machine learning model may share at least one of: common positions along the wellbore, common directions, common time intervals, and common data sets.

Operations 200 continue at block 210b, by providing at least a second subset of the additional training data as second input values to the second instance of the machine learning model. In certain embodiments, the second subset may include a portion of the training data, such as a portion of information types, a portion of depths, and/or a portion of directions. In certain embodiments, the second subset may include a same set of information types of the first subset.

Operations 200 continue at block 210c, by receiving second output values from the second instance of the machine learning model based on the second input values. In certain embodiments, the second output values may be determined by computing a value of the objective function of the machine learning model based on the second input values and current weighting values.

Operations 200 continue at block 210d, by iteratively adjusting the weighting values of the second instance of the machine learning model based on the second output values and the additional training data. For example, the second output values from the second instance of the machine learning model may be compared with their respective labels, and the weighting values may be adjusted based on the comparison. In certain embodiments, iteratively adjusting the weighting values of the second instance of the machine learning model may include adjusting the weighting values to minimize a mean square error between each output value and its respective label, where each label represents a known value for a corresponding input. In certain embodiments, once the output values match the corresponding labels for at least a subset of the training data, the trained machine learning model is used as part of a process for determining earth models as described herein. Optimization of the second instance of the machine learning model can involve optimization algorithms described with regard to the first instance of the machine learning model without limitation.

Operations 200 continue at block 212, by generating an earth model based on output values from at least one of: the first instance of the machine learning model, the second instance of the machine learning model, or a combination thereof. For example, the machine learning model may output one or more parameters such as geomechanical, wellbore stability, pore pressure, and/or petrophysical attributes from an output layer. The parameters output by the model may include parameters with respect to the at least one depth point and parameters related to a plurality of directions with respect to the at least one depth point, such as up, down, left, right, forward, and/or backward. The earth model can be a high-resolution earth model due to the use of a machine learning model to process a wide variety of inputs that provide a detailed picture of the well.

Operations 200 continue at block 214, by adjusting a drilling operation according to the earth model, wherein the drilling operation is selected from the group consisting of: a well placement, a well trajectory, a mud weight, a backpressure, a pumping rate, a fluid composition, a casing depth, a weight on bit, a torque on bit, a bit speed, a tripping speed, a rate of penetration (ROP), and combinations thereof.

As mentioned earlier, conventional techniques receive log data in a depth domain and seismic data in a time domain. A process of tying is used to accurately relate the seismic data to the log data, usually by converting the seismic data to the depth domain using conventional depth to time conversion algorithms, such as a time-depth curve. In addition, creating well ties can involve seismic image processing, wavelet creation, geologic interpretation, and manual corrections. Thus, converting seismic data to the depth domain is a slow process. Aspects of the present disclosure can avoid the need to convert data between the time domain and the depth domain. Furthermore, aspects of the present disclosure can automate and accelerate the creation of well ties. Thus, the present disclosure can facilitate use of real-time earth models that include seismic data in the time domain instead of the depth domain. In certain embodiments, operations described herein can be improved by relating data between different measurement domains in real-time. For instance, in order to effectively use earth models that are updated during drilling, conventional and time-consuming processes to convert data between domains of time and depth can be avoided. In that regard, FIG. 3 illustrates example operations 300 for dynamic tying of time to depth.

Figure 3:
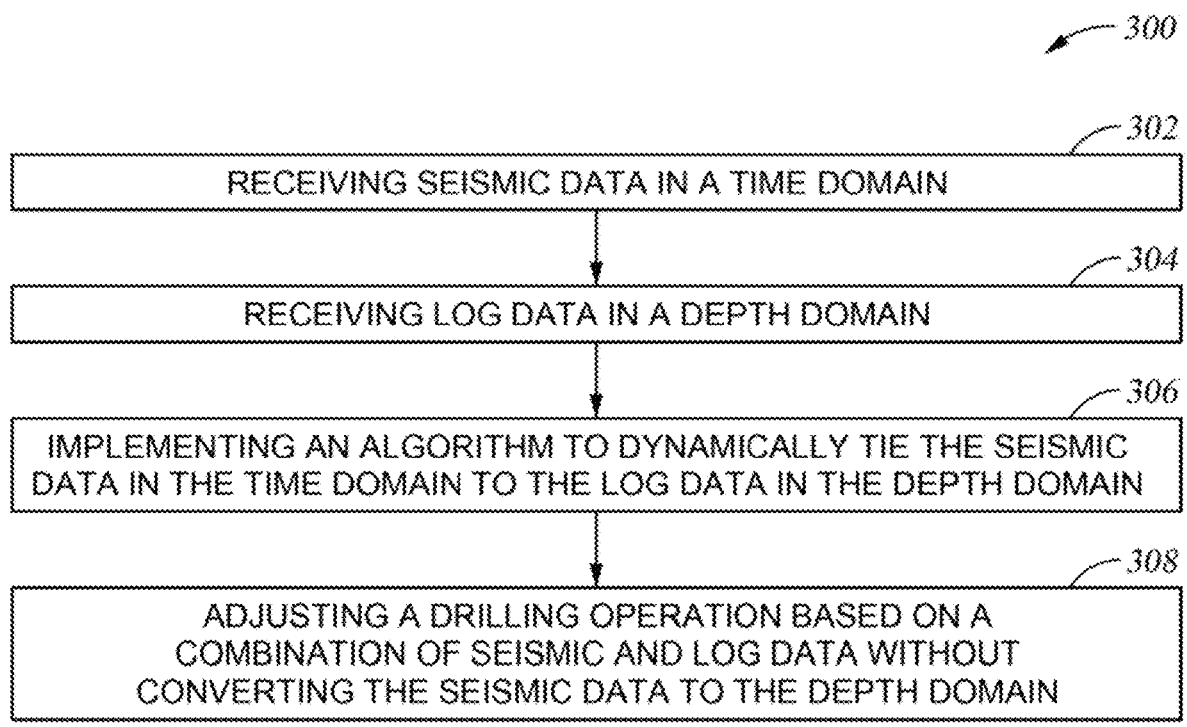
FIG. 3 illustrates example operations for dynamic tying of time to depth.

Referring to FIG. 3, operations 300 begin at block 302, by receiving an earth model having seismic data in a time domain. In certain embodiments, the earth model may be generated in real-time, such as within minutes, such as about 10 min or less, such as about 5 min or less. In certain embodiments, the seismic data is acquired using geophones placed in a wellbore. In certain embodiments, acquisition of the seismic data can involve geophones, hydrophones, and/or seismometers positioned on the surface of the earth, at the seafloor, and/or subsea. In certain embodiments, a source having suitable type and intensity generates acoustic or elastic vibrations that travel through strata having different seismic responses. The vibrations are recorded by receivers having suitable configuration and orientation with respect to geological features. In certain embodiments, the seismic data can include 2D or 3D reflection, shear wave, refraction, velocity or anisotropy fields generated during imaging, and combinations thereof.

Operations 300 continue at block 304, by receiving log data in a depth domain. In certain embodiments, the log data can be measured using a logging while drilling (LWD) tool. In other embodiments, the log data can be measured using another logging tool suspended in the wellbore on wireline. In certain embodiments, the logging tool may include one or more induced nuclear sondes, such as a PNC sonde (aka pulsed neutron lifetime (PNL) sonde and/or carbon/oxygen sonde), a density (aka gamma-gamma) sonde, a neutron porosity sonde, or combinations thereof. As is known in the art, induced nuclear sondes, density sondes, and neutron porosity sondes are tools that contain radioactive sources. The logging tool may also include one or more passive (aka natural) nuclear sondes that do not contain radioactive sources, such as a gamma ray sonde, a spectral gamma ray sonde, or combinations thereof. The logging tool may also include one or more nonnuclear sondes, such as a spontaneous potential (SP) sonde, a resistivity sonde, a sonic sonde, a nuclear magnetic resonance sonde, a caliper sonde, a temperature sonde, and combinations thereof.

In certain embodiments, the measured data can be processed to determine one or more elastic property logs (aka mechanical property log or rock strength log) of the formation, such as Poisson's ratio, Young's modulus, shear modulus, bulk modulus, Biot's constant, Lame's constant, modulus of compressibility, brittleness index, rock strength, and combinations thereof. The measured data may also be processed to determine one or more other property logs of the formation, such as a density log, a sonic velocity log (shear and/or compressional), a production index log, and combinations thereof. In certain embodiments, a depth of the logging tool may be monitored by a position sensor in communication with a rig winch. A cable head may connect the logging tool to the wireline and include a load cell for monitoring tension in the wireline to compensate the measured depth for tension induced extension of the wireline. The logging tool may be located at a vertical end of the formation and operated while raising or lowering the logging tool to the other vertical end of the formation. Thus, by using the depth measurement of the logging tool, each of the foregoing logs are recorded in the depth domain. Thus, the log data cannot be directly related to the seismic data which is in the time domain. Instead, a conversion is needed between the time domain and the depth domain. In practice, the seismic data is converted to the depth domain; however, data conversion can be a slow process.

In that regard, operations 300 continue at block 306, by implementing an algorithm to dynamically tie the seismic data in the time domain to the log data in the depth domain. In certain embodiments, the algorithm may include a real-time velocity model. In certain embodiments, the log data may be in the time domain instead of in the depth domain, and the algorithm may dynamically tie the seismic data in the time domain to the log data in the time domain.

Operations 300 continue at block 308, by adjusting a drilling operation based on a combination of seismic and log data without converting the seismic data to the depth domain. In certain embodiments, the drilling operation is selected from the group consisting of: a well placement, a well trajectory, a mud weight, a backpressure, a pumping rate, a fluid composition, a casing depth, a weight on bit, a torque on bit, a bit speed, a tripping speed, an ROP, and combinations thereof. By enabling use of seismic data in the time domain, aspects of the present disclosure can enable adjustments to be made to the drilling operation at a faster rate.

As mentioned earlier, conventional techniques employ models having manually selected and fixed input variables, which are prone to depend too heavily on redundant variables while overpowering less redundant variables. The overall effect produces a biased model. Aspects of the present disclosure can avoid the overpowering effect of redundant variables through an automatic input selection process. In certain embodiments, operations described herein can be improved by automatically selecting input variables for one or more of the plurality of candidate machine learning models. In that regard, FIG. 4 illustrates example operations 400 for automatic selection of input variables.

Figure 4:
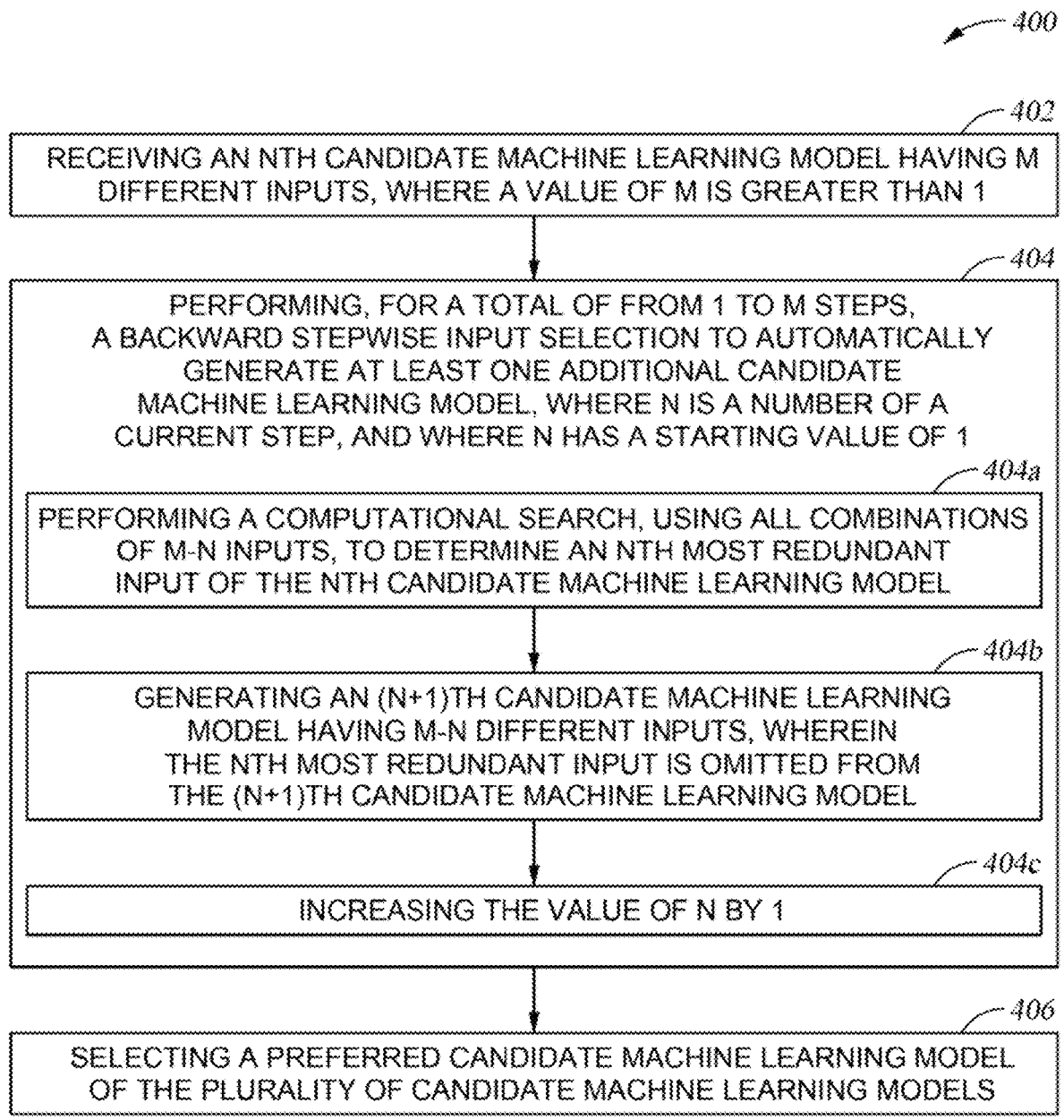
FIG. 4 illustrates example operations for automatic selection of input variables.

Referring to FIG. 4, operations 400 begin at block 402, by receiving an nth candidate machine learning model having M different inputs, where a value of M is greater than one. In certain embodiments, a value of M is 100 or less, such as from 1 to 100, such as from 10 to 90, such as from 20 to 80, such as from 30 to 70, such as from 40 to 60, such as from 40 to 50, such as 45. In certain embodiments, the inputs can include drilling parameters, including for example, weight-on-bit (WOB), rate of penetration (ROP), standpipe pressure, pump pressure, differential pressure, flow rate, hookload, RPM, torque, and/or mud weight. In certain embodiments, a number of drilling parameters included as inputs may be 2 or greater, such as 2 to 20, such as 5 to 15, such as 9. In certain embodiments, the inputs can include inputs above and/or below a current formation plane.

Operations 400 continue at block 404, by performing, for a total of from 1 to M steps, a backward stepwise input selection to automatically generate at least one additional candidate machine learning model, where n is a number of a current step, and where n has a starting value of 1. In certain embodiments, a number of steps may be from 1 to 100, such as from 10 to 70, such as from 20 to 50, such as from 30 to 40, such as 30.

The performing of the backward stepwise input selection may include one or more intermediate steps. For instance at block 404a, operations 400 continue by performing a computational search, using all combinations of M-n inputs, to determine an nth most redundant input of the nth candidate machine learning model. The nth most redundant input is a current most redundant input of the nth candidate machine learning model. In certain embodiments, the nth most redundant input is an input that is least valuable to nth candidate machine learning model. In certain embodiments, the nth most redundant inputs is an input that is least significant. In certain embodiments, the computational search involves a neural network calibration analysis performed across the different combinations of inputs to determine a root mean square error (RMSE) for different data subsets, such as training data, validation data, and testing data. In certain embodiments, the least significant input is an input that has a smallest effect on RMSE of the previous step. In other words, the nth least significant input is selected from all M-n candidate inputs. By comparing the model performance with all possible M-n inputs, the least significant input is the input having a minimum difference in calculated RMSE between the set of M-n inputs without the least significant input and the previous optimal set of M-n+1 inputs.

Operations 400 continue at block 404b, by generating an (n+1)th candidate machine learning model having M-n different inputs, where the nth most redundant input is omitted from the (n+1)th candidate machine learning model. The (n+1)th candidate machine learning model is saved. In certain embodiments, the (n+1)th candidate machine learning model is a best candidate machine learning model for the current step as determined by the computational search of block 404a.

Operations 400 continue at block 404c, by increasing the value of n by 1. If the value of n, after increasing by 1, is less than or equal to the total number of steps, operations 400 continue by returning to block 404a to begin a next step. If the value of n, after increasing by 1, is greater than the total number of steps, operations 400 continue at block 406, by selecting a preferred candidate machine learning model of the plurality of candidate machine learning models. In certain embodiments, selecting the preferred candidate machine learning model involves comparing each of the best candidate machine learning models from each step. In certain embodiments, the preferred candidate machine learning model is the model that uses an optimum number of inputs and generates a minimum overall RMSE on the training, validation and testing data for single network realization. In other embodiments, all candidate models with the best given number of inputs in each step are retained in the model base for member network selection in constructing the neural network ensemble. In certain embodiments, the foregoing process can apply to both SO and MO models.

In at least one example, starting at block 402, a value of M is set to 45, defining a first candidate machine learning model having 45 different inputs. In this example, at block 404, a total number of steps is equal to 30. In this example, implementing 30 steps of the backward stepwise input selection generates 30 additional candidate machine learning models. In this example, a final candidate machine learning model, generated after 30 steps, has 15 inputs. In this example, at block 404a, a computational search is performed using all combinations of 44 inputs to determine a first most redundant input of the first candidate machine learning model. In this example, at block 404b, a second candidate machine learning model having 44 different inputs is generated by omitting the first most redundant input. In this example, at block 404c, the value of n is increased by 1, so that a current value of n is equal to 2. Since the current value of n of 2 is less than the total number of steps of 30, the operation returns to block 404a to being a second step.

In this example, at block 404a of the second step, a computational search is performed using all combinations of 43 inputs to determine a second most redundant input of the second candidate machine learning model. It will be appreciated that the second most redundant input is a current most redundant input of the 43 inputs of the second candidate machine learning model. However, the second most redundant input is also second most redundant relative to the first most redundant input of the first candidate machine learning model. In this example, at block 404b of the second step, a third candidate machine learning model having 43 different inputs is generated by omitting the second most redundant input. In this example, at block 404c of the second step, the value of n is increased by 1, so that a current value of n is equal to 3. Since the current value of n of 3 is less than the total number of steps of 30, the operation returns to block 404a to being a third step. In this example, the operation continues through 30 steps until the current value of n, after being increased by 1, is equal to 31. Since the current value of n of 31 is greater than the total number of steps of 30, the operation continues to block 406.

In this example, at block 406, the plurality of candidate machine learning models includes the first candidate machine learning having 45 different inputs along with 30 additional candidate machine learning models generated by the 30 steps of the backward stepwise input selection process. Thus, the plurality of candidate machine learning models includes a total of 31 candidate machine learning models having from 15 different inputs to 45 different inputs.

Figure 5:
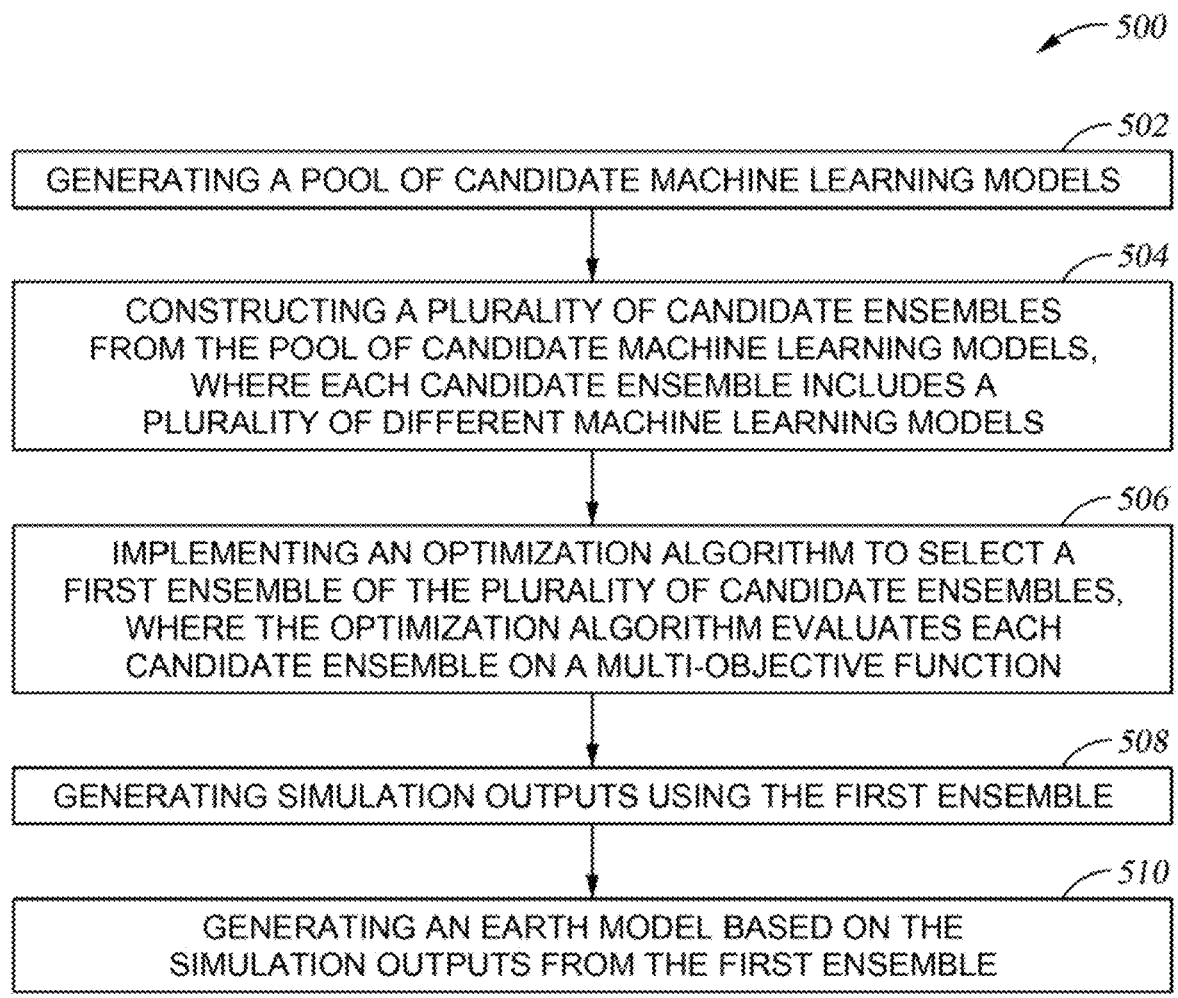
FIG. 5 illustrates example operations for automatically generating modeling ensembles.

As mentioned earlier, conventional techniques use a single machine learning model. Since each machine learning model applies only a single corresponding learning algorithm, many models prove to be suboptimal for a majority of formations. Aspects of the present disclosure can avoid the suboptimal use of a single learning algorithm across varied formation types, depths, conditions, etc. (i.e., different problem types), by employing modeling ensembles combining multiple machine learning models having different learning algorithms. In certain embodiments, operations described herein can be improved by selectively applying modeling ensembles based on physical constraints of the formation (physics-based AI). In that regard, FIG. 5 illustrates example operations 500 for automatically generating modeling ensembles. In certain embodiments, modeling ensembles generate results based on a plurality of machine learning models using knowledge of correlations between different parameters in a cost function.

Referring to FIG. 5, operations 500 begin at block 502, by generating a pool of candidate machine learning models. In certain embodiments, the pool of candidate machine learning models may be generated by the automatic input selection process described herein.

Operations 500 continue at block 504, by constructing a plurality of candidate ensembles from the pool of candidate machine learning models, where each candidate ensemble includes a plurality of different machine learning models. In certain embodiments, constructing the plurality of candidate ensembles can include forming subsets of candidate machine learning models from the pool of candidate machine learning models. In certain embodiments, forming the subsets of and/or updating a population of candidate machine learning models may be performed iteratively through ranking, crossover, mutation, and/or combination. In certain embodiments, a candidate machine learning model can be presented in more than one candidate ensemble.

In certain embodiments, ensemble selection can be based on minimizing validation error based on reference measurements. However, reference measurements are usually unavailable, and instead, selection can be based on observable measurements as follows. Operations 500 continue at block 506, by implementing an optimization algorithm to select a first ensemble of the plurality of candidate ensembles, where the optimization algorithm evaluates each candidate ensemble on a multi-objective function. In certain embodiments, the optimization algorithm is based at least in part on a relationship between physical formation attributes. In certain embodiments, pertinent physical formation attributes can include a relationship between compression and sonic shear, a relationship between compressional strength and density, a relationship between wave speeds of p- and s-waves, a relationship between DTC and density, and combinations thereof. For example, compression and sonic shear can have a positive proportional relationship, such that increasing compression is correlated to increasing sonic shear when the rock becomes stiff. Likewise, compressional strength and density can have a positive proportional relationship, such that increasing compressional strength is correlated to increasing density. In certain embodiments, ensembles that fail to satisfy the foregoing physical relationships are less likely to be selected. In certain embodiments, the optimization algorithm can be or include genetic algorithms, evolution strategies, evolutionary programming, simulated annealing, Gaussian adaptation, hill climbing, swarm intelligence, methods based on integer linear programming, other suitable algorithms, or combinations thereof. In certain embodiments, in addition to an optimization algorithm, any derivative-free algorithm can be used. In certain embodiments, trial and error can be used for a small number of candidate ensembles. In certain embodiments, selecting a first ensemble of the plurality of candidate ensembles can include selecting an ensemble where model outputs of sections already drilled through stay as constant as possible from one run to the next.

In certain embodiments, the multi-objective function includes an optional prediction error value evaluated on the training data. In certain embodiments, the multi-objective function includes an optional complexity value corresponding to averaged sum-squared-weights of each candidate ensemble. In certain embodiments, the optional complexity value can be a penalty term. In certain embodiments, the multi-objective function includes an optional out-of-range value corresponding to a difference between the training data and simulation outputs of each candidate ensemble. In certain embodiments, the multi-objective function includes an optional cross-correlation value corresponding to a difference between first and second simulation outputs of each candidate ensemble. In certain embodiments, the optional cross-correlation value can involve relationships between formation attributes, such as compression-sonic shear, compressional strength-density, p-wave speed-s-wave speed, DTC-density, and combinations thereof. In certain embodiments, cross-correlation can only apply to MO models. In certain embodiments, the multi-objective function includes an optional negative correlation value to measure the product of deviated simulation outputs of each particular member network and the sum of deviated simulation outputs of other member networks. In certain embodiments, the deviated simulation output is the difference between the member network output and the ensemble output averaged over all the member network outputs. In certain embodiments, adding weights on negative correlations can encourage construction of ensembles with diverse member network outputs to minimize the uncertainty of ensemble simulation outputs on the new data. In certain embodiments, the first ensemble of the plurality of candidate ensembles is an ensemble that most optimizes the multi-objective function. The weighting factors on multi-objective functions can vary depending on the optimization data selection. In certain embodiments, the ensemble selected to optimize the simulation of a known testing well can be directly used to predict the outputs of a nearby blind well. In other embodiments, ensemble switching can be applied by selecting different member networks from the same candidate model base in simulating outputs of various blind wells. In certain embodiments, the candidate networks are trained with MO structure, but the ensemble selection can be SO based, to best optimize simulation of each SO without remodeling candidate networks using SO structure.

Operations 500 continue at block 508, by generating simulation outputs using the first ensemble. In certain embodiments, a confidence of the first ensemble can be assessed with other ensembles sorted from multiple solutions through an optimization process. In some aspects, the confidence of the ensemble output is much higher than a single network output. The variance in simulation outputs of different ensembles is lower than the variance in outputs of different individual networks. Compared to single network realization, the uncertainty of ensemble simulation can be reduced even if a less optimal ensemble is selected. In certain embodiments, the confidence can be determined on any 2D plane or full volume simulation file. In certain embodiments, outputs can be scaled from about −10 to about 10 before calculating variance. Scaling accounts for different outputs having different magnitudes. In certain embodiments, confidence is greater closer to a wellbore. In certain embodiments, confidence plots can be used to monitor performance of various models Operations 500 continue at block 510, by generating an earth model based on the simulation outputs from the first ensemble. The earth model can be generated using techniques described herein without limitation. In certain embodiments, earth models generated using a modeling ensemble compared to a single model can improve results across varied formation types, depths, conditions, etc. Functionally, ensemble implementation in this disclosure applies multiple neural network filters to variable inputs in ruggedizing output simulation. The utilization of a diverse model base overcomes the limitations associated with single network such as hyperparameter initialization, complexity determination, and input selection. Ensemble construction through evolutionary computation acts as the secondary modeling to incorporate multi-objective optimization into member network selection that cannot be achieved with conventional neural network training. In practice, the same member network can be present more than once for a given ensemble, providing a weighted average in ensemble output. By optimizing the number of member networks that constitute an ensemble, the simulated ensemble output can be more accurate on average than a single network prediction in modeling and testing without losing resolution.

As mentioned earlier, conventional earth models are not often updated and/or are updated at a frequency that is less than optimal. Aspects of the present disclosure can provide updating of earth models in real-time, on-demand, and/or at any suitable frequency. In certain embodiments, earth models of the present disclosure can be updated within minutes, such as about 10 min or less, such as about 5 min or less. In certain embodiments, manual users may have difficulty in reliably evaluating output data streams with enough time to adapt to updated formation features that may prove hazardous to drilling. In that regard, FIG. 6 illustrates example operations 600 for using computer vision to automatically interpret formation features.

Figure 6:
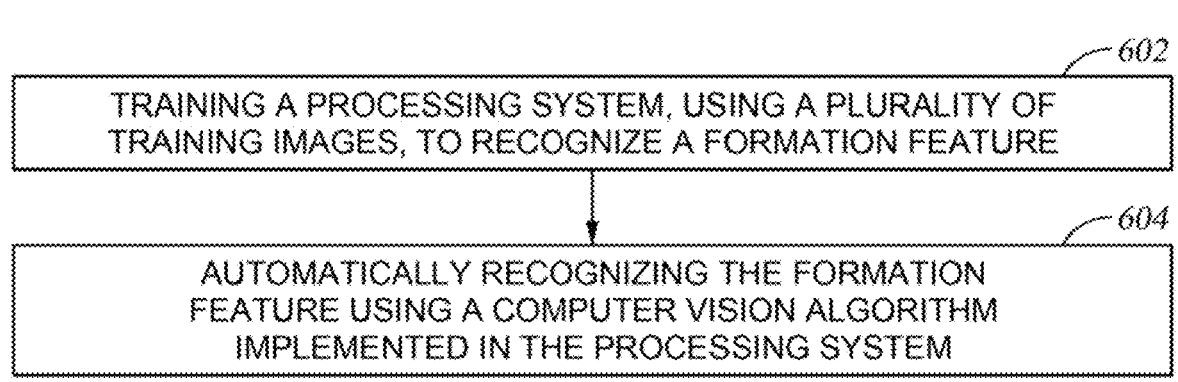
FIG. 6 illustrates example operations for using computer vision to automatically interpret formation features.

Referring to FIG. 6, operations 600 begin at block 602, by training a processing system, using a plurality of training images, to recognize formation features. In certain embodiments, the formation features can include faults, vugs, structural drilling hazards, and combinations thereof. The processing system consists of layers of linear algebra, also known as a neural network. Images are presented to the system as one or more matrices of numbers, each representing a pixel value, or several color values for its corresponding pixel. By presenting each image to the processing system, recognition is achieved by adjusting and correcting the system, through backpropagation, when a wrong output is given (i.e., by making small changes to the weights and biases in the neural network in order for the processing system to output the intended prediction). These changes are iteratively made until the neural network remains stable and cannot make any more changes for improvement to its predictive power. Specifically for machine vision, this neural network is prefaced by a convolutional layer (i.e., a series of window filters applied to the image prior to the neural network). These filters are also iteratively adjusted with the same backpropagation until the window filters remain stable so that the system can learn to recognize features in the images related to the concept being predicted, including textures, patterns, changes, and/or shapes.

Operations 600 continue at block 604, by automatically recognizing the formation feature using a computer vision algorithm implemented in the processing system. The new images presented to the computer vision algorithm are fed in the same way as the training images (i.e., as one or more matrices of numbers representing image pixels). This data is propagated forward through the window filters and the linear algebra system, until the model outputs a prediction, which is used to interpret whether a target formation feature was recognized.

Figure 7:
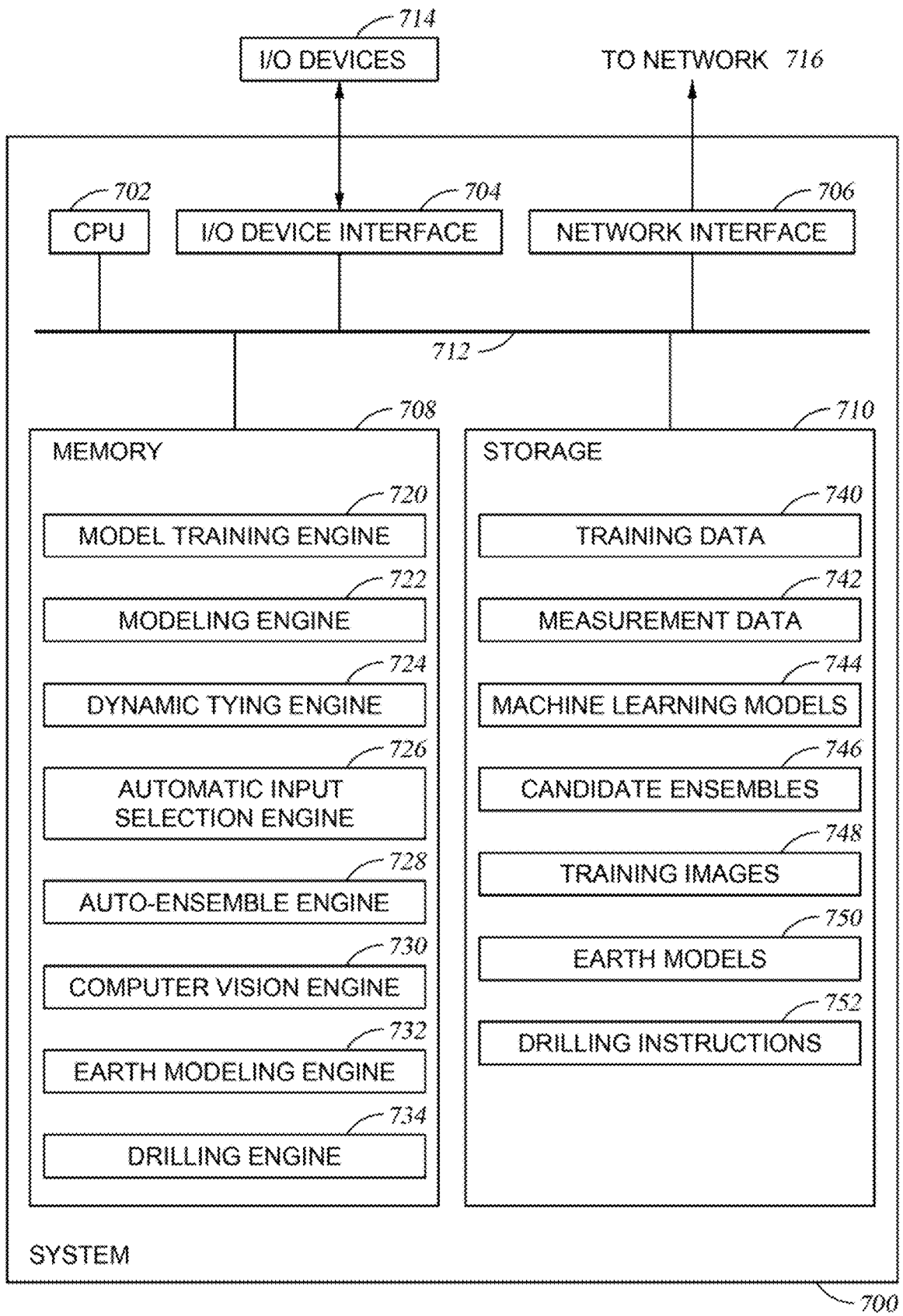
FIG. 7 illustrates an example computer system for implementing embodiments of the present disclosure.

FIG. 7 illustrates an example computer system 700 for implementing embodiments of the present disclosure. As shown, the system 700 includes a central processing unit (CPU) 702, one or more I/O device interfaces 704 that may allow for the connection of various I/O devices 714 (e.g., keyboards, displays, mouse devices, pen input, etc.) to the system 700, a network interface 706, memory 708, storage 710, and an interconnect 712.

The CPU 702 may retrieve and execute programming instructions stored in the memory 708. Similarly, the CPU 702 may retrieve and store application data residing in the memory 708. The interconnect 712 transmits programming instructions and application data, among the CPU 702, the I/O device interface 704, the network interface 706, the memory 708, and the storage 710. The CPU 702 is included to be representative of a single CPU, multiple CPUs, a single CPU having multiple processing cores, and the like. Additionally, the memory 708 is included to be representative of a random access memory. Furthermore, the storage 710 may be a disk drive, solid state drive, or a collection of storage devices distributed across multiple storage systems. Although shown as a single unit, the storage 710 may be a combination of fixed and/or removable storage devices, such as fixed disc drives, removable memory cards or optical storage, network attached storage (NAS), or a storage area-network (SAN). The memory 708 can include a model training engine 720, a modeling engine 722, a dynamic tying engine 724, an automatic input selection engine 726, an auto-ensemble engine 728, a computer vision engine 730, an earth modeling engine 732, a drilling engine 734, and combinations thereof. The storage 710 can include training data 740, measurement data 742, one or more machine learning models 744, one or more candidate ensembles 746, a plurality of training images 748, one or more earth models 750, one or more drilling instructions 752, and combinations thereof.

In certain embodiments, the model training engine 720 can use the training data 740 and the measurement data 742 for training the one or more machine learning models 744, for example according to operations 200 of FIGS. 2A-2B. In certain embodiments, the one or more machine learning models 744 can be simulated using the modeling engine 722. In certain embodiments, the dynamic tying engine 724 can enable utilization of the measurement data 742 in real-time, for example by relating seismic data in the time domain to log data in the depth domain according to operations 300 of FIG. 3. In certain embodiments, the measurement data 742 can be recorded during drilling and used in real-time. In certain embodiments, the automatic input selection engine 726 can generate one or more additional machine learning models 744, for example according to operations 400 of FIG. 4. In certain embodiments, the auto-ensemble engine 728 can use one or more candidate ensembles 746 to select an ensemble based on a multi-objective function, for example according to operations 500 of FIG. 5. In certain embodiments, the computer vision engine 730 can use the plurality of training images 748 for training the computer vision engine 730 to automatically recognize formation features, for example according to operations 600 of FIG. 6. In certain embodiments, the earth modeling engine 732 can generate one or more earth models 750 based on outputs of the modeling engine 722. In certain embodiments, the drilling engine 734 can generate one or more drilling control instructions 752 to control drilling based on the one or more earth models 750.

One or more of the model training engine 720, the modeling engine 722, the dynamic tying engine 724, the automatic input selection engine 726, the auto-ensemble engine 728, the computer vision engine 730, the earth modeling engine 732, and the drilling engine 734 in memory 708 may communicate with other devices (e.g., components of a drilling system) over a network 716 (e.g., the internet, a local area network, or the like) through network interface 706 (e.g., in order to receive measurements, provide output and instructions, and the like).

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a graphics processing unit (GPU), a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The invention claimed is:

1. A method, comprising:
   receiving detected data, wherein the detected data includes formation attributes relating to a first depth point along a wellbore;
   training a first instance of a machine learning model based on the detected data, wherein the training of the first instance of the machine learning model comprises:
     initializing weighting values of the first instance of the machine learning model with random values;
     iteratively adjusting the weighting values of the first instance of the machine learning model based on an objective function and the detected data in order to determine final weighting values of the first instance of the machine learning model;
   receiving additional detected data, wherein the additional detected data includes formation attributes relating to a second depth point along the wellbore;
   training a second instance of the machine learning model based on the additional detected data, wherein the training of the second instance of the machine learning model comprises:
     initializing weighting values of the second instance of the machine learning model with the final weighting values of the first instance of the machine learning model;
     iteratively adjusting the weighting values of the second instance of the machine learning model based on the objective function and the additional detected data in order to determine final weighting values of the second instance of the machine learning model;
   generating an earth model based on:
     a first predicted parameter related to the first depth point that is determined using the first instance of the machine learning model; and
     a second predicted parameter related to the second depth point that is determined using the second instance of the machine learning model.

2. The method of claim 1, wherein iteratively adjusting the weighting values of each of the first and second instances of the machine learning model comprises:
   adjusting the weighting values to minimize a mean square error between each output value and a corresponding label, wherein each label represents a known value for a corresponding input.

3. The method of claim 1, further comprising:
   generating drilling control instructions to adjust a drilling operation according to the earth model, wherein the drilling operation is selected from the group consisting of: a well placement, a well trajectory, a mud weight, a backpressure, a pump rate, a fluid composition, a casing depth, a weight on bit, rotations per minute, flow rate, a torque on bit, a bit speed, a tripping speed, and a rate of penetration.

4. The method of claim 1, wherein the earth model comprises seismic data in a time domain, the method comprising:
   implementing an algorithm to dynamically tie the seismic data in the time domain to log data in a depth domain.

5. The method of claim 4, wherein the algorithm comprises a real-time velocity model.

6. The method of claim 1, wherein the earth model comprises seismic data in a time domain, the method comprising:
   implementing an algorithm to dynamically tie the seismic data in the time domain to log data in the time domain.

7. The method of claim 1, further comprising:
   generating drilling control instructions to adjust a drilling operation based on the second predicted parameter, wherein the drilling operation is selected from the group consisting of: a well placement, a well trajectory, a mud weight, a backpressure, a pump rate, a fluid composition, a casing depth, a weight on bit, rotations per minute, flow rate, a torque on bit, a bit speed, a tripping speed, and a rate of penetration.

8. The method of claim 1, further comprising:
   automatically selecting input variables for one or more of a plurality of candidate machine learning models.

9. The method of claim 8, wherein automatically selecting the input variables comprises:
   receiving an nth candidate machine learning model having M different inputs, wherein M is greater than 1;
   performing, for a total of from 1 to M steps, a backward stepwise input selection to automatically generate at least one additional candidate machine learning model, wherein n is a number of a current step, wherein n has a starting value of 1, and wherein each step comprises:

first, performing a computational search, using all combinations of M-n inputs, to determine an nth most redundant input of the nth candidate machine learning model;

second, generating an (n+1)th candidate machine learning model having M-n different inputs, wherein the nth most redundant input is omitted from the (n+1)th candidate machine learning model; and third, increasing the value of n by 1; and selecting a preferred candidate machine learning model of the plurality of candidate machine learning models.

10. The method of claim 1, wherein the detected data comprises one or more information types selected from the group consisting of: seismic volumes, seismic geologic maps, seismic images, electromagnetic volumes, checkshots, gravity volumes, horizons, synthetic log data, well logs, mud logs, gas logs, well deviation surveys, isopachs, vertical seismic profiles, microseismic data, drilling dynamics data, initial information from wells, core data, gamma, temperature, torque, differential pressure, standpipe pressure, mud weight, downhole accelerometer data, downhole vibration data, gamma, resistivity, neutron, density, compressional, or shear logs.

11. The method of claim 1, comprising:

training a processing system, using a plurality of training images, to recognize a formation feature selected from the group consisting of: a fault, a vug, and a structural drilling hazard; and automatically recognizing the formation feature using a computer vision algorithm implemented in the processing system.

12. The method of claim 1, comprising:

constructing a plurality of candidate ensembles, wherein each candidate ensemble includes a plurality of different machine learning models;

implementing an optimization algorithm to select a first ensemble of the plurality of candidate ensembles, wherein the optimization algorithm evaluates each candidate ensemble on a multi-objective function;

generating simulation outputs using the first ensemble; and generating an additional earth model based on the simulation outputs from the first ensemble.

13. The method of claim 12, wherein the multi-objective function comprises at least one parameter selected from the group consisting of:

a prediction error value evaluated on the training data;

a complexity value corresponding to averaged sum-squared-weights of each candidate ensemble;

an out-of-range value corresponding to a difference between the training data and simulation outputs of each candidate ensemble;

a cross-correlation value corresponding to a difference between first and second simulation outputs of each candidate ensemble;

a negative correlation value corresponding to an average across the candidate ensembles;

a seismic data correlation value; and a compressional-wave velocity/shear-wave velocity (Vp/Vs) limit value.

14. The method of claim 12, comprising:

generating a pool of candidate machine learning models, wherein constructing the plurality of candidate ensembles comprises:

forming subsets of candidate machine learning models from the pool of candidate machine learning models, wherein forming the subsets is an iterative process utilizing at least one technique selected from the group consisting of:

ranking, crossover, mutation, and combination.

15. The method of claim 12, comprising:

quantifying a confidence of the first ensemble, comprising:

determining variance in the simulation outputs of the first ensemble by comparing between individual simulation outputs from each machine learning model of the first ensemble.

16. The method of claim 12, wherein, of the plurality of candidate ensembles, the first ensemble most optimizes the multi-objective function.

17. The method of claim 12, wherein the optimization algorithm is based at least in part on a relationship between physical formation attributes, wherein the relationship is selected from the group consisting of: a relationship between compression and sonic shear, a relationship between compressional strength and density, a relationship between wave speeds of p- and s-waves, a relationship between DTC and density, and combinations thereof.

* * * * *